(12) United States Patent
Gabrys et al.

(10) Patent No.: US 12,160,508 B2
(45) Date of Patent: Dec. 3, 2024

(54) SYSTEM FOR PROVIDING SECURE COMMUNICATIONS AND RELATED METHODS

(71) Applicant: Naval Information Warfare Center Pacific, San Diego, CA (US)

(72) Inventors: Ryan Gabrys, San Diego, CA (US); Luis M. Martinez, San Diego, CA (US); Sunny James Fugate, San Diego, CA (US); Mike Tall, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 265 days.

(21) Appl. No.: 17/742,283

(22) Filed: May 11, 2022

(65) Prior Publication Data

US 2023/0370260 A1    Nov. 16, 2023

(51) Int. Cl.
*H04L 9/08* (2006.01)
*H04L 9/16* (2006.01)
*H04L 9/14* (2006.01)
*H04L 9/28* (2006.01)

(52) U.S. Cl.
CPC .......... *H04L 9/0869* (2013.01); *H04L 9/0822* (2013.01); *H04L 9/0825* (2013.01); *H04L 9/0894* (2013.01)

(58) Field of Classification Search
None
See application file for complete search history.

(56) References Cited

U.S. PATENT DOCUMENTS

| | | | |
|---|---|---|---|
| 2017/0372617 A1* | 12/2017 | Bruno | G08G 5/0052 |
| 2020/0097025 A1* | 3/2020 | Zhang | G05D 1/102 |
| 2020/0280725 A1* | 9/2020 | Zhu | H04N 19/103 |
| 2020/0404154 A1* | 12/2020 | Cen | H04N 23/63 |
| 2021/0014486 A1* | 1/2021 | Ma | H04N 19/14 |
| 2022/0013020 A1* | 1/2022 | Guetta | B64F 1/20 |
| 2022/0078349 A1* | 3/2022 | Feng | G03B 15/006 |
| 2022/0194625 A1* | 6/2022 | Zhang | B64U 10/40 |
| 2022/0315240 A1* | 10/2022 | Kubisiak | B64U 70/40 |

OTHER PUBLICATIONS

Cho, S.-M., Hong, E. & Seo, S.-H.; Random Number Generator Using Sensors for Drone; IEEE Access, vol. 8, pp. 30343-30354; Feb. 10, 2020.
Gabrys, R. & Martinez, L. ; A Change Would Do You Good: GA-Based Approach for Hiding Data in Program Executables; GECCO'19, Prague, Czech Republic, Jul. 13-17, 2019.

(Continued)

*Primary Examiner* — Venkat Perungavoor
(74) *Attorney, Agent, or Firm* — Naval Information Warfare Center, Pacific; Kyle Eppele; Eric VanWiltenberg (57) ABSTRACT

A system and related methods that generate encryption keys using two inputs. The first input is random data measured or supplied at the time the encryption keys are created. The second input is predetermined data held by the server and device. Given knowledge of the predetermined data and the random data, the UxS will be able to regenerate its previous encryption keys and also to re-establish communication by the server and device.

12 Claims, 11 Drawing Sheets

(56) References Cited

OTHER PUBLICATIONS

Gabrys, R., Martinez, L., Tall, M. & Fugate, S. J.; Dynamic Temporal Encryption: A Scheme for Maintaining Secure Encryption Keys in Tactical Environments; 16th International Conference on Cyber Warfare and Security; Feb. 25-26, 2021.

Gabrys, R., Martinez, L. & Fugate, S. J.; How to swap instructions midstream: An embedding algorithm for program steganography; Proceedings of the 7th Symposium on Hot Topics in the Science of Security, Aug. 25, 2020.

Hennebert, C., Hossayni, H. & Lauradoux, C.; Entropy Harvesting from Physical Sensors; WiSec '13: Proceedings of the sixth ACM conference on Security and privacy in wireless and mobile networks; Apr. 2013.

\* cited by examiner

Step 1101: recording a plurality of random data from at least one sensor system, wherein the plurality of random data comprises sensor data recorded by the at least one sensor system.

Step 1103: combining a first random data of a plurality of random data with predetermined data into combined data.

Step 1105: seeding an encryption algorithm with the combined data to generate a public key and a private key.

Step 1107: converting the first random data using a conversion function to create converted random data.

Step 1109: storing the converted random data and public key in a plurality of software executables using a steganographic encoding technique.

Step 1111: encrypting data of interest with the public and private keys.

Step 1113: transferring the encrypted data of interest.

Step 1115: retrieving the converted random data and public key from the plurality of software executables using a steganographic decoding technique.

Step 1117: extracting the first random data from the converted data using the conversion function and a second random data of the plurality of random data.

Step 1119: reseeding an encryption algorithm with the combined data to regenerate the public key and the private key.

Fig. 11

SYSTEM FOR PROVIDING SECURE COMMUNICATIONS AND RELATED METHODS

STATEMENT REGARDING FEDERALLY SPONSORED RESEARCH OR DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 114242.

BACKGROUND OF THE INVENTION

Unmanned systems (UxS) need to protect data at rest (DaR) and data in transit (DiT). Providing encryption mechanisms for a UxS can be difficult and expensive due to the logistical complexities of communicating with distant systems. When a disconnected, intermittent, or low-bandwidth (DIL) event is encountered, anti-tampering protocols are automatically enacted and all data on the UxS is locked out. Once such an event occurs, the UxS cannot be easily reused and must be physically removed, which requires an entirely new system to be deployed in its place. A key step in this process, and one which is normally not automated, involves recovering the encryption keys. Storing the encryption keys somewhere on the UxS system is not an option because non-authorized users could potentially gain access to the UxS and compromise the security of existing communication sessions. Key management systems (KMS) can be hosted locally on a device, but deployed UxSs may not have enough available compute power to host such a service. Furthermore, even if such a service can be hosted locally, the authentication method used to access the local KMS may not provide a sufficient level of security depending on the nature of the encrypted data.

SUMMARY OF THE INVENTION

The present invention relates to a system for generating encryption keys using two inputs. The first input is random data measured or supplied before or at the time the encryption keys are created. The second input is predetermined data held by the server and device. If an unauthorized user accesses the UxS, the data will be significantly different compared to when the encryption keys were set up. In addition, an unauthorized user will not have access to the predetermined data the UxS was using, so it will not be possible for the unauthorized user to determine either of the two inputs required to generate the previous encryption keys and re-establish the UxS's previous communication sessions. However, if the interruption in communication is the result of an intermittent communication failure, the state of the random data will not change as much during this period. Then, given knowledge of the predetermined data along with the random data, the UxS will be able to regenerate its previous encryption keys and also to re-establish communication.

According to a further illustrative embodiment of the present disclosure, the generation of encryption keys using two inputs can be combined with existing DAR encryption systems. The exemplary system's encryption algorithm can generate a key encryption key that can encrypt data encryption keys generated by the existing DAR encryption systems.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the drawings particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Exemplary embodiments of the system utilize software modules in conjunction with hardware components to generate encryption keys using two inputs. The first input is random data measured or supplied from a random data source. The second input is predetermined data stored in the hardware. Given knowledge of the predetermined data and the random data, the system be able to regenerate its previous encryption keys and also to re-establish communication. In an illustrative example, the system includes a server communicating with a client UxS. The random data can include data recorded by the UxS. The predetermined data can include an operation plan that the UxS follows. The UxS uses the random data and predetermined data to seed an encryption algorithm to generate encryption keys. Sensitive data (e.g., sensor data, operation plan, etc.) can then be encrypted for storage on the UxS or transfer to the server.

Figure 1:
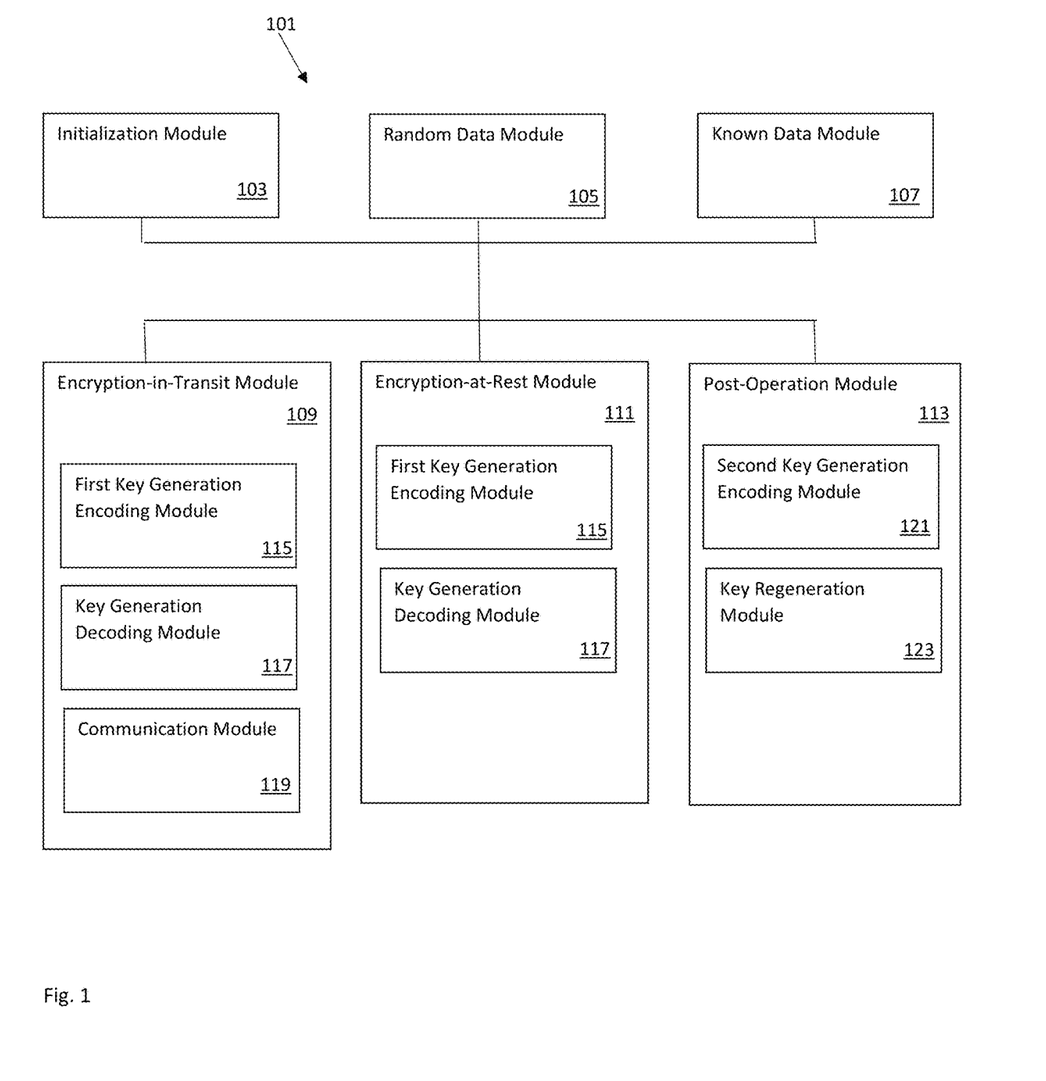
FIG. 1 shows an exemplary simplified system software architecture diagram.

FIG. 1 shows an exemplary software architecture diagram for a simplified system 101. The initialization module 103 can perform standard startup tasks such as powering relevant hardware (e.g., a UxS operating as a client or UxS hardware such as movement systems and sensor systems), establishing a connection between a UxS operating as a client and a user operations center acting as a server, loading relevant software modules (such as those shown in FIG. 1), and selecting known and random data sources. The random data module 105 can be configured to generate random data for use by other modules of the system.

Random data module 105 can generate data using any method that is statistically random. An exemplary method to achieve this to tie the data generation to a physical random source. Virtual random sources can be used, but as with some physical random sources their randomness can often be predicted or replicated, so they may not provide enough security for a particular application. If a client device operates in an area with inconsistent network coverage, using an on-board random source can ensure that random data will always be available. Otherwise, random sources can be stored server-side. In at least some embodiments, random data module 105 can use sensor data (e.g., temperature, humidity, pressure, orientation, acceleration, image, etc.) to generate random data. While sensor data has bounded limits based on the operating environment, one could ignore the predictable or non-entropic digits of the data (e.g., the first two digits of a barometer measuring in pascals). In at least some embodiments, random data module 105 can use radioactive decay data to generate random data. In at least some embodiments, random data module 105 can use electronic noise from components of a client device to generate random data.

Figure 2:
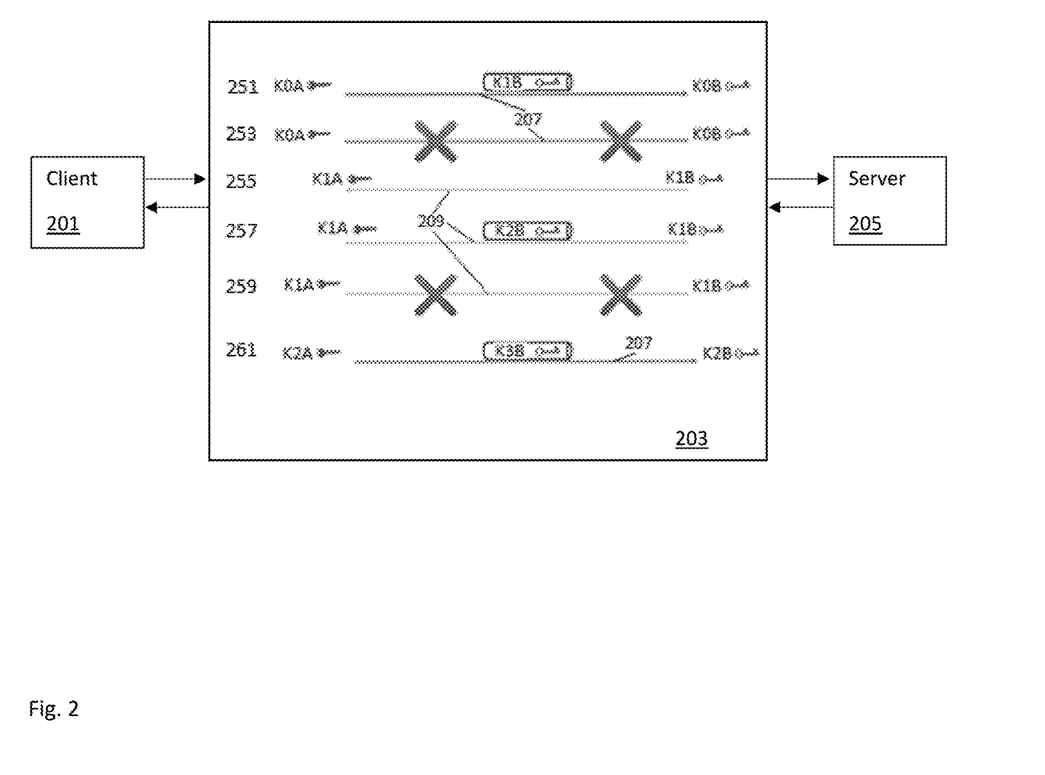
FIG. 2 shows an overview of an exemplary encryption protocol in an operational mode using first and second network channels.
Figure 3:
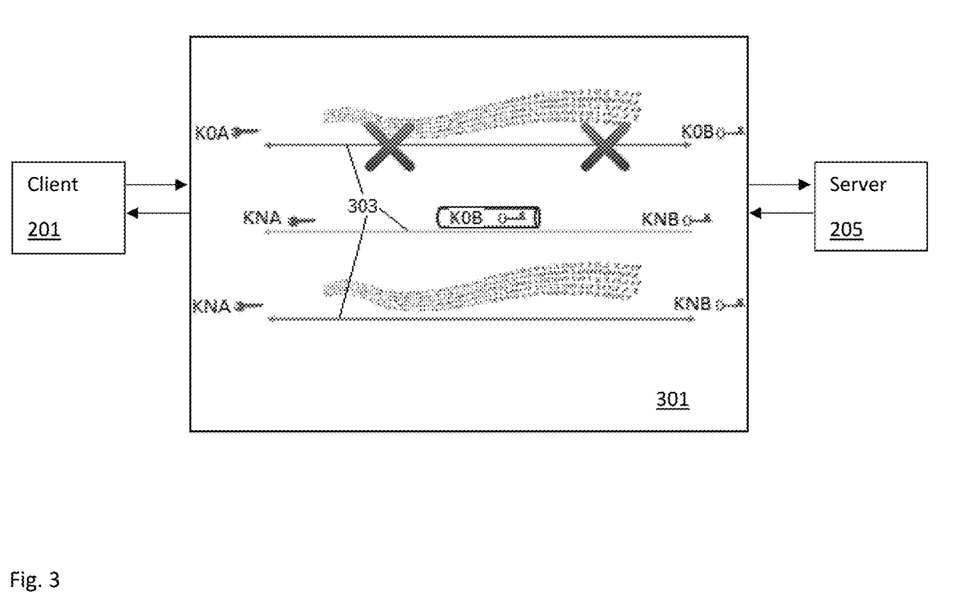
FIG. 3 shows an overview of an exemplary encryption protocol in a recovery mode using a third network channel.
Figure 4:
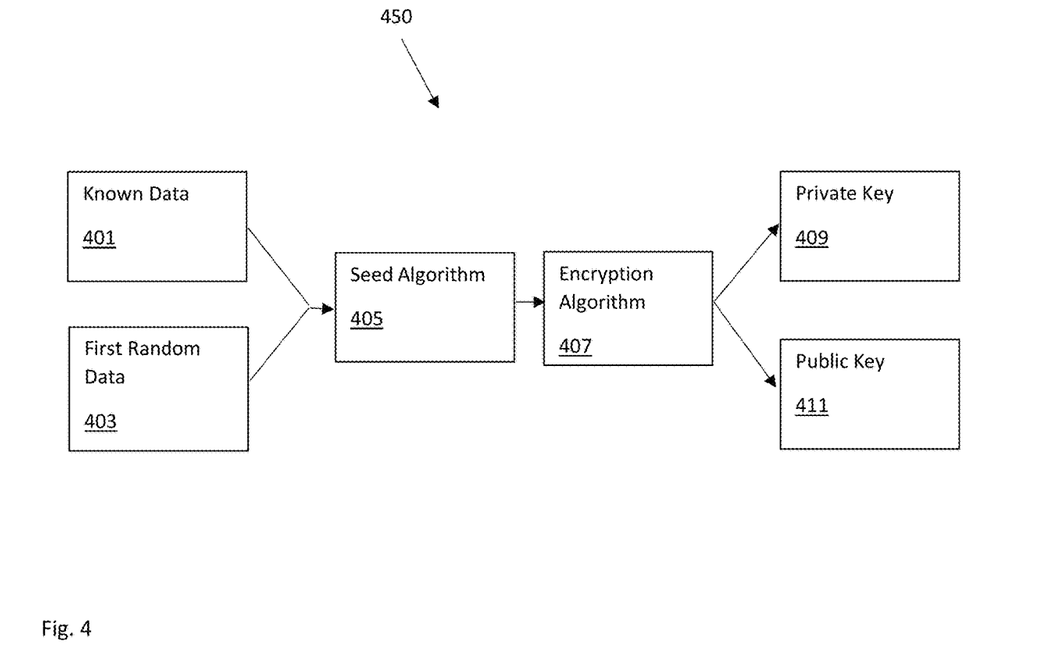
FIG. 4 shows an overview of an exemplary public and private key generation process.
Figure 5:
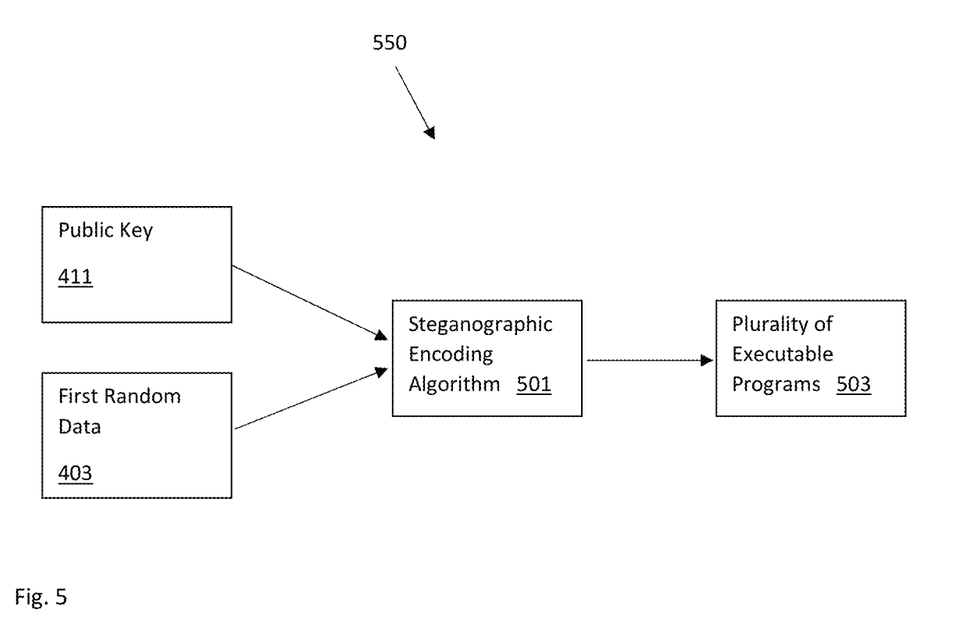
FIG. 5 shows an overview of an exemplary process for generating software executables.
Figure 6:
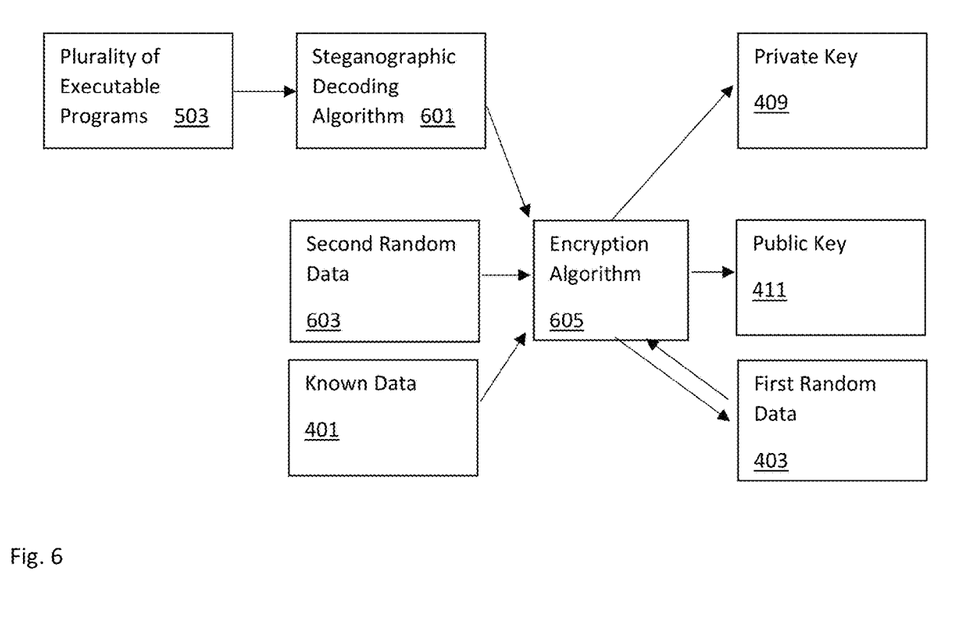
FIG. 6 shows an overview of an exemplary key generation decoding module process.
Figure 8:
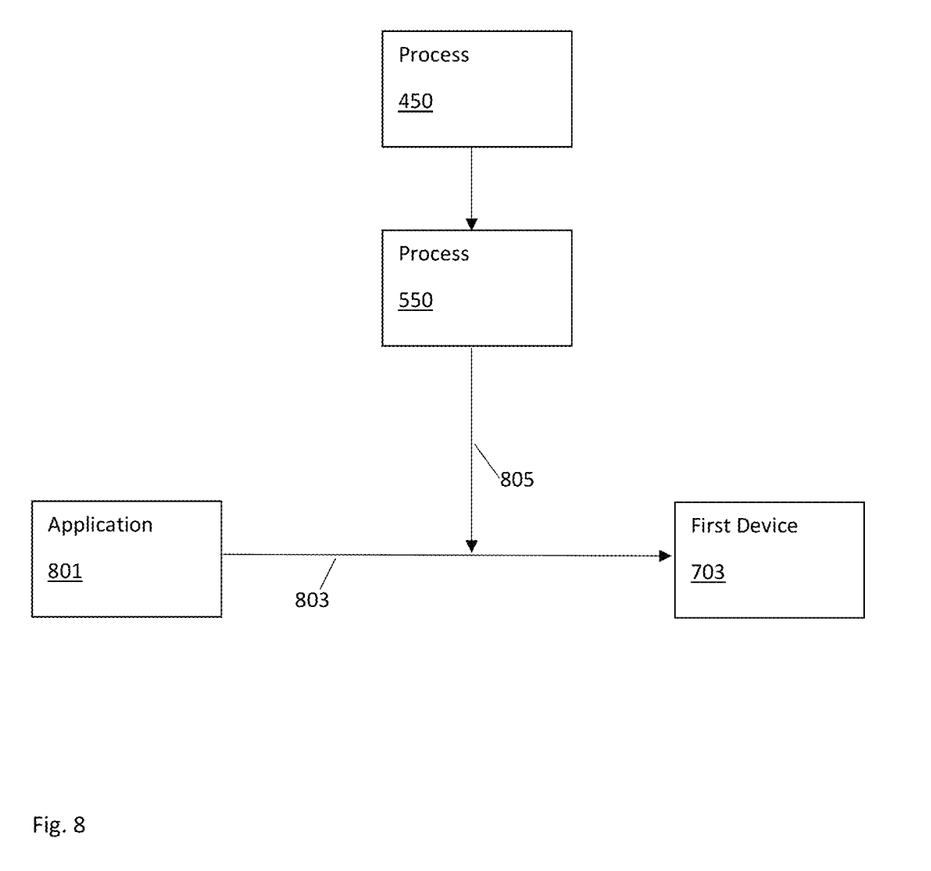
FIG. 8 shows an overview of an exemplary process for encrypting DaR.
Figure 9:
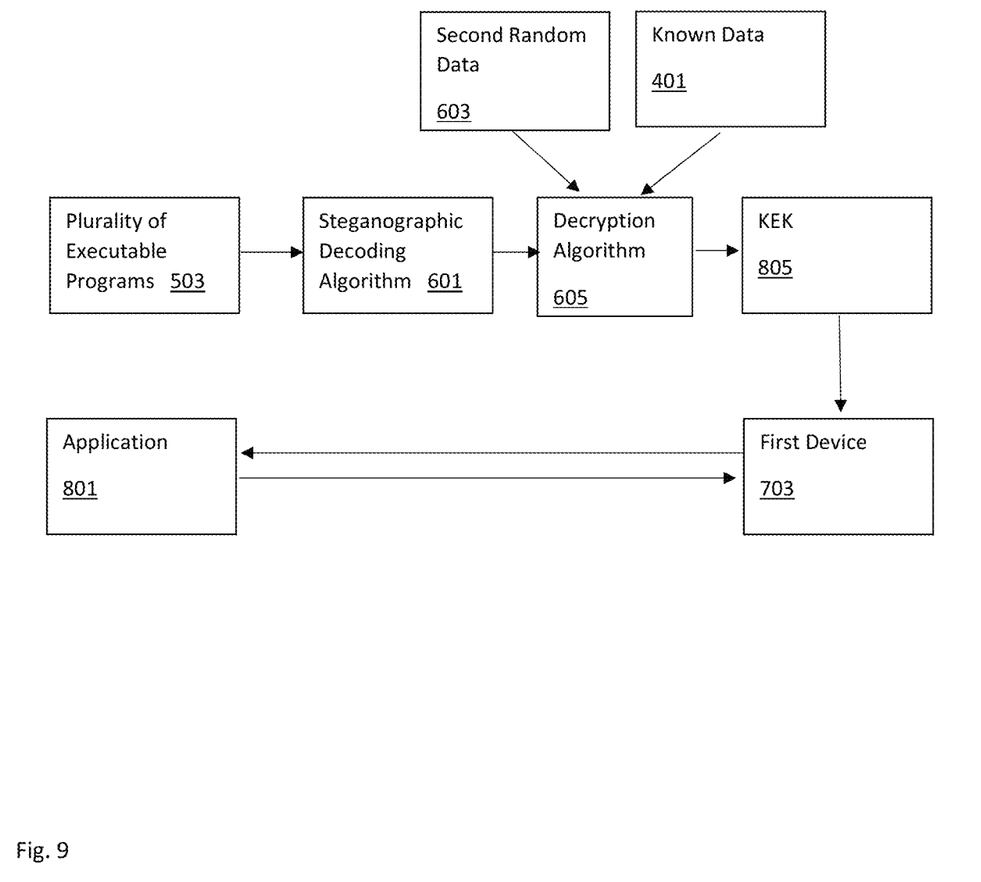
FIG. 9 shows an overview of an exemplary process for decrypting DaR.
Figure 10:
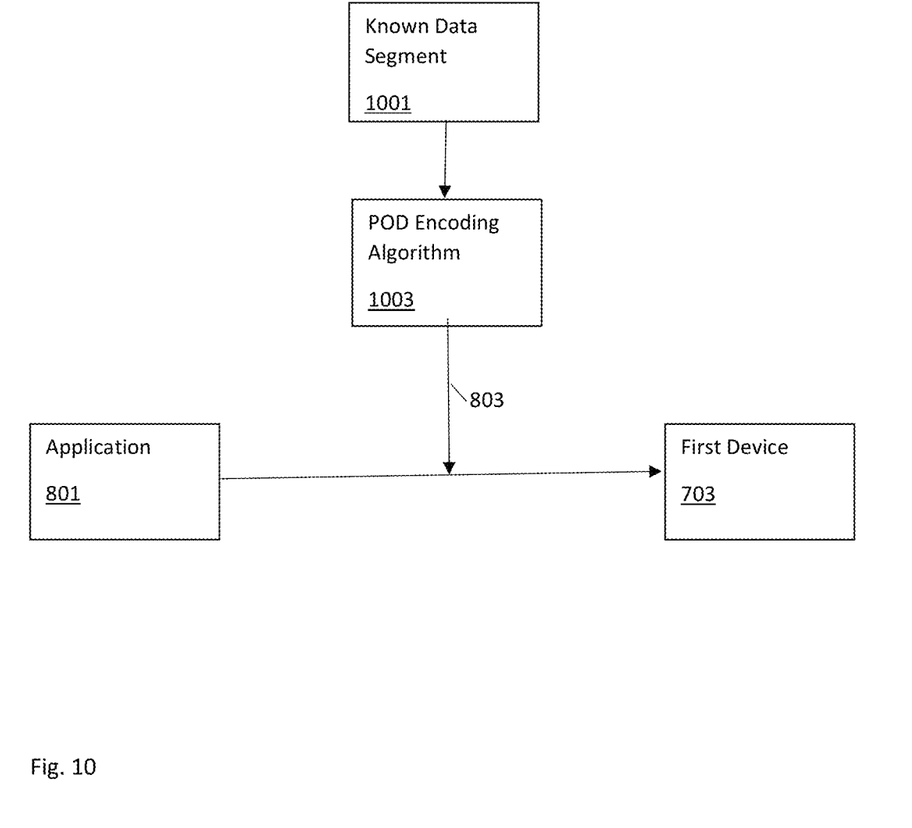
FIG. 10 shows an overview of an exemplary process for encrypting post-operation data.

The predetermined data module 107 can be configured to store at least one predetermined set of data for use by other modules of the system. Exemplary embodiments of the system can use a plurality of predetermined sets of data by utilizing the predetermined sets of data individually as predetermined data segments (as shown in FIG. 10) or combining the predetermined sets of data into a single data chunk. Encryption-in-transit (EiT) module 109 can be configured to encrypt DiT being collected by a client device and transmitted to and from a server. EiT module 109 can use a first key generation encoding module 115 to generate private and public keys from the random data and predetermined data and store the keys (e.g., as shown in FIGS. 4-5). EiT module 109 can use a key generation decoding module 117 to decode the random data and predetermined data to recover the public and private keys if a communication error occurs (e.g., as shown in FIG. 6). EiT module 109 can use communication module 119 to transfer keys between server and client and re-establish secure communication with recovered keys (e.g., as shown in FIGS. 2-3). EiT module 109 can also use communication module 119 to transmit data (e.g., encrypted data) between a server and client devices. Encryption-at-rest (EaR) module 111 can be configured to encrypt DaR being collected and stored by a client device (as shown in FIGS. 8-9). EaR module 111 can use a first key generation encoding module 115 to generate private and public keys from the random data and predetermined data. EaR module 111 can use a key generation decoding module 117 to decode the random data and predetermined data to recover the public and private keys. Post-operation (PO) module 113 can be configured to encrypt PO data (POD) being collected and stored by a client device. PO module 113 can use a second key generation encoding module 121 to generate private and public keys from predetermined data. PO module 113 can use a key regeneration module 123 to regenerate the keys used throughout operation. Exemplary systems 101 can include and use any combination of modules 109, 111, 113 as each can independently operate and accomplish different goals.

FIG. 2 shows an overview of an exemplary communication protocol in an operational mode using first and second network channels 207, 209. The first and second network channels 207, 209 can be used to pass encryption keys between a client 201 and server 205. The first and second network channels 207, 209 operate at mutually exclusive times (e.g., while first network channel is active, second network channel is inactive) while a third network channel operates concurrently with the first and second network channels. FIG. 2 shows the sequential steps in which the first and second network channels 207, 209 can operate. At step 251, the first network channel 207 is encrypted using a first private key K0A on the server 205 and a first public key K0B on the client 201, then the server passes a new public key, second public key K1B. The client 201 receives the second public key K1B and uses it to connect to the server 205 over the second network channel 209. At steps 253, 255, the first network channel 207 is then closed and communication continues over the second network channel 209. At step 257, the server 205 sends a third public key K2B over the second network channel 209. The third public key K2B is used by the client 201 to connect to the server over the reopened first network channel 207 and at step 259 the second network channel 209 is closed. This process is then repeated (e.g., step 261) until a communication failure occurs where, at that point, the network protocol switches to recovery mode (shown in FIG. 3). The third network channel is used to exchange data between a client and server (as shown in FIG. 3).

FIG. 3 shows an overview of an exemplary encryption protocol in a recovery mode using a third network channel 303. Initially the server 205 and client 201 are exchanging information over the third network channel 203 using the public and private key pair K0B, K0A. Due to the communication failure event the third network channel loses its connection. At this point, the client 201 reconnects to the server 205 using the most recent public key KNB. As part of the authentication protocol, the client 201 also passes the previously used public key K0B back to the server 205. The client 201 and server 205 then continue to exchange information over the third network channel 203 securely.

FIGS. 4 and 5 show an overview of an exemplary public and private key generation process 450 and an overview of an exemplary process for generating software executables 550 used by the first key generation encoding module shown in FIG. 1. Using a cryptographic hash function, the predetermined data ($b_P$) 401 can be hashed into a character array of $b_P$ bytes and random data ($b_R$) 403 can be hashed into a character array of $b_R$ bytes. In embodiments utilizing a plurality of predetermined data segments, the predetermined data segments can be concatenated or otherwise combined to form a single predetermined data 401. As part of seed algorithm 405, the $b_P$ bytes can then be concatenated with the $b_R$ bytes form a string h of $b_P + b_R$ bytes. The string h is used as the seed to an encryption algorithm 407 which outputs the public key (p) 409 and private key ($p^{-1}$) 411 pair. $H(b_R) = (h_1, h_2, \ldots, h_N)$, where H is a conversion function that takes as input an array of bytes and outputs another byte string. In at least some embodiments, the system can store (p, $H(b_R)$) across N+1 software executables 503 using a steganographic encoding algorithm 501 of a steganographic technique. Public key 409 can be stored in a first executable, $h_1$ can be stored in a second executable, $h_2$ can be stored in a third executable, and so on.

In at least some embodiments, the steganographic technique can include identifying in the executable code a set of pairs of interchangeable assembly-level instructions. Each pair of instructions has an order of execution of its constituent instructions that is reversible without changing a functionality or performance of the executable code. The next step provides for organizing the pairs of interchangeable assembly-level instructions into a plurality of random matrices based on a set of random seeds. Each seed maps to exactly one matrix. Then, for each random matrix, the next step provides for inverting a submatrix consisting of a subset of columns from each matrix to identify a subset of pairs of interchangeable instructions. The next step provides for identifying a matrix from the plurality of matrices that has full column rank on a subset of columns that is a function of the location of each of the pairs of interchangeable instructions and then storing an index of the identified matrix's associated seed in a secure data storage location. The next step provides for encoding binary information into the executable code by reversing the order of execution of the subset of pairs of interchangeable instructions and treating each pair having reversed instructions as a "1" and each pair of interchangeable instructions having an original order of execution as a "0" or vice versa.

FIG. 6 shows an overview of an exemplary key generation decoding module process for recovering public key 411 and first random data 403. The public encryption key along with the data $H(b_R)$ can be recovered from the plurality of software executables 503 using the steganographic decoding algorithm 601 of a steganographic technique. In exemplary embodiments of the system, the steganographic decoding algorithm 601 can include recovering the seed which was used to create the matrix of the encoding algorithm from the secure location. The matrix is then recovered using the seed to reverse the encoding inversions. As part of encryption algorithm 605, recovery function H is used along with the second random data ($b'_R$) 603 to recover $b_R$ 403, after which h is computed from $b_K$ and $b_R$. Second random data 603 can be data from the same source as first random data 403 (e.g. sensor data, radioactive decay, electronic noise, etc.) recorded at a later point in time. The string h is used as the seed to the encryption algorithm 605 to generate the public/private key pair (p, $p^{-1}$). As long as current random data $b'_R$, is within a predetermined range to the original state of the first random data $b_R$ 403, then provided $H(b_R)$ and $b'_R$, one can determine $b_R$. However, if the state of the random data has changed significantly so that $b'_R$ differs enough from $b_R$, then $b_R$ cannot be determined given $H(b_R)$ and so the decryption will fail. Note also that the decryption relies on the hash of the predetermined data 401 as well so that without the predetermined data, the decryption method will also fail. Together, these two failure states prevents unauthorized users from decrypting the data. For the former failure state, a device operating in an intended fashion will have a relatively known and predictable operational environment. Significant changes in random data can suggest that the device has been moved to an unauthorized location outside of the intended operational environment. For example, temperature and humidity ranges in the operational environment can be predicted in advance. A user can set the system to allow temperature and humidity changes within the expected range variance while using temperature and humidity sensor readings to seed encryption (as shown in FIG. 4). If the device experiences a humidity decrease exceeding the allowed range variance, decryption will fail and the system assumes the device has been brought to an unauthorized location. For the latter failure state, the predetermined data 401 acts as specific information the user must know/possess in order to access the system/data. If a user does not have the predetermined data 401, decryption will fail.

In exemplary embodiments of the system, function H allows one to recover $b_R$ from $b'_R$ provided $H(b_R)$. $b_R$ can be an array comprised of symbols from some discrete alphabet. First a user specifies how much to allow for each component to vary on average. Let $\Delta=(\delta_1, \delta_2, \ldots, \delta_n)$ be a vector of length n. Then we say that $b_R=(b_1, \ldots, b_n)$ and $b'_R=(b'_1, \ldots, b'_n)$ are (t, $\Delta$)—similar if $|\{j:|b_j-b'_j|>\delta_j\}|\leq t$. In words, this means that there are at most t random data sources whose difference exceeds the change allowed by $\Delta$. Let $q=2 \max \{\delta_1, \ldots, \delta_n\}+1$ and $Q=2 \max \{b_1, b_2, \ldots, b_n, b'_1, \ldots, b'_n\}+1$ where q, Q are assumed to be odd primes. Let $Enc_{k,t}$ denote a systematic encoder for a Reed-Solomon code over $F_q$ which takes as input a length k vector over $F_Q$ and it outputs 2t redundancy symbols which together form a length k+2t codeword. Let $Dec_{k,t}$ denote the decoder for this Reed-Solomon code. In particular, if $e \in F_Q^{k+2t}$ has at most t non-zero components and $m \in F_Q^k$, then $Dec((m, Enc_{k,t}(m))+e)=m$. Let $R=Enc_{n,t}(b_1, b_2, \ldots, b_n)=(r_1, \ldots, r_{2t})$. The function H is defined as $H(b_R)=(b_1 \mod 2\delta_1+1, \ldots, b_n \mod 2\delta_n+1) \times (r_1, r_2, \ldots, r_{2t}) \in [[q]]^n \times F_Q^{2t}$. For this setup, the parameter N would be equal to n+2t where $h_1=H(b_R)_1$, $h_2=H(b_R)_2$, and so on.

Figure 7:
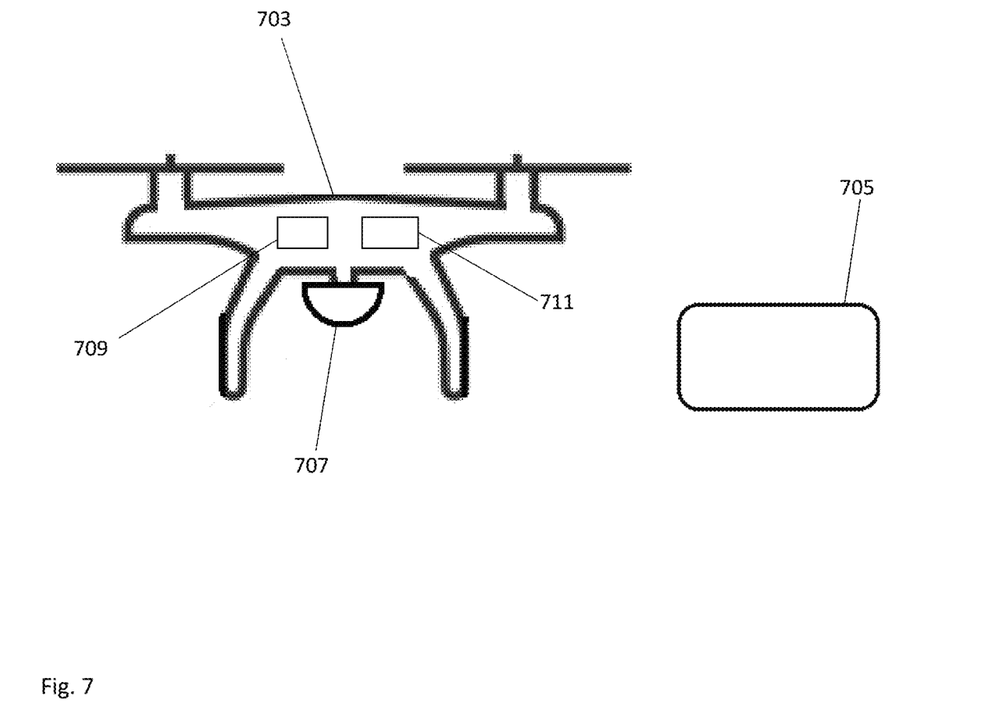
FIG. 7 shows exemplary hardware used with exemplary communication systems.

FIG. 7 shows exemplary first and second devices 703, 705 that can host exemplary communication systems. In exemplary embodiments of the system, first device 703 can be a UxS capable of operating autonomously for extended periods of time. First device 703 can include a random data source 707 capable of generating random data for use in a random data module. In exemplary embodiments of the system, random data source 707 can be a sensor system that measures the environment around first device 703 (e.g., temperature) or the operating conditions of first device 703 (e.g., altitude). First device 703 can include an electronics section 709 and a communication system 711. In exemplary embodiments of the system, electronics section 709 can include a computer readable medium that stores the plurality of modules shown in FIG. 1. In exemplary embodiments of the system, second device 705 can be a server capable of wirelessly communicating with first device 703 through communication system 1105.

FIG. 8 shows an overview of an exemplary process for encrypting DaR within an EaR module. In this embodiment, an application 801 is choosing to encrypt an exemplary data chunk. The data chunk is encrypted using a DEK 803, and the KEK 805, which is used to wrap the DEK, can be generated with the public and private key generation process 450 and a process for generating software executables 550. The KEK 805 is generated using a seed which is created from a combination of the predetermined data and the first random data. The data H ($b_{SD}$) is stored across a collection of executable programs like the embodiment shown in FIG. 5.

The EaR module regenerates cryptographic keys at regular intervals based upon the existing predetermined data and random data. However, unlike the EiT module, the EaR module does not require sending the updated public keys to any hosts in the environment, and so the communication module used for DiT does not need to be used for DaR. The EaR module can work in conjunction with an existing EaR system, wherein the EaR system maintains a key hierarchy consisting of a set of DEKs 803 which are protected using a single KEK 805. The EaR module provides a capability similar to a KMS in that it maintains the KEK 805 for an existing encryption at rest solution. The algorithm used to generate the KEK 805 can be the same first key generation encoding module used by the EiT module, and the decoding algorithm can likewise be the same key generation decoding module used by the EiT module.

FIG. 9 shows an overview of an exemplary process for decrypting DaR within an EaR module. First, the wrapped DEK, which is stored in persistent memory, is recovered. The KEK 805 along with the data $H(b_R)$ can be recovered from the plurality of software executables 503 using the steganographic decoding algorithm 601 of a steganographic technique. As part of encryption algorithm 605, function H is used along with the second random data $(b'_R)$ 603 to recover $b_R$ 403, after which h is computed from $b_P$ and $b_R$. The string h is used as the seed to the encryption algorithm 605 to generate the KEK 805. The DEK is then unwrapped by first device 703 using the KEK 805 and the DEK is used to recover the encrypted data and send it to application 801. The processes shown in FIGS. 8-9 should execute at regular intervals so that the KEK 805 can be periodically updated. Because the private encryption key for the KEK generated during this process is never stored in non-volatile memory or storage, unauthorized users who do not have access to the predetermined data or the previous random data will not be able to regenerate the KEK.

FIG. 10 shows an overview of an exemplary process for encrypting POD within a PO module. In at least some exemplary embodiments of the system, a UxS will record data that is not accessed for the duration of an operation, but is instead intended for PO analysis. In the exemplary embodiments of the system, the POD DEKs 803 are not encrypted with a KEK. Instead, a POD encoding algorithm 1003 directly generates the DEK 803 by using a cryptographic hash function, wherein a predetermined data segment $(b_P)$ 1001 is hashed into a character array of $b_P$ bytes. The string $b_P$ is used as the seed to the encryption algorithm which outputs the public/private key pair $(p, p^{-1})$. Similar to the EaR module, the DEK 803 is also not stored anywhere on the system. When application 801 wants to encrypt an exemplary data chunk, the system generates a DEK 803 corresponding to the current predetermined data segment 1001 and stores the encrypted data on first device 703. Each iteration of the PO module uses a separate predetermined data segment 1001. In exemplary embodiments of the system, each predetermined data segment corresponds to a portion of an operational plan. The module periodically zeroizes (or deletes) previous predetermined data segments as the corresponding portions of the operational plan is completed. In exemplary embodiments of the system, predetermined data segments 1001 are generated externally and then transferred to the system during operation. The plurality of predetermined data segments together form combined predetermined data.

The decryption process uses the combined predetermined data to generate the predetermined data segments 1001 that were used to generate the DEKs 803. Using these predetermined data segments, one can regenerate the collection of DEKs 803 and decrypt the stored POD. Because the system periodically zeroizes portions the predetermined data segments during operation, the total predetermined data is never available until the end of the process. As such, the UxS will be unable to access the POD for the duration of the process, and unauthorized personnel will be unable to decrypt the data without access to the total predetermined data.

Figure 11:
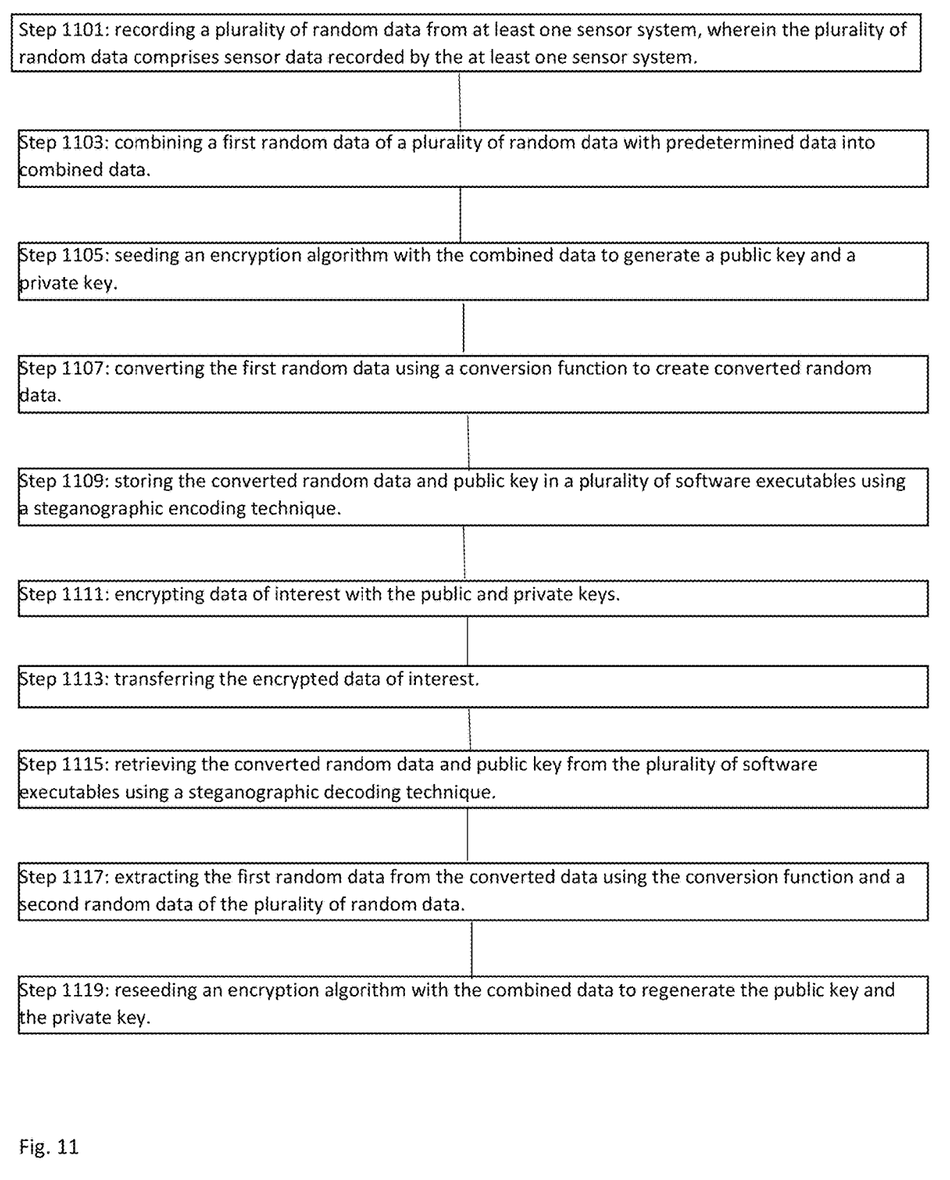
FIG. 11 shows an exemplary method for providing secure communications.

FIG. 11 shows an exemplary method for providing secure communications. At step 1101: recording a plurality of random data from at least one sensor system. In exemplary embodiments of the system, the plurality of random data comprises sensor data recorded by the at least one sensor system. At step 1103, combining a first random data of a plurality of random data with predetermined data into combined data. In exemplary embodiments of the system, the predetermined data is an operational plan that is executed by an unmanned system. At step 1105, seeding an encryption algorithm with the combined data to generate a public key and a private key. At step 1107, converting the first random data using a conversion function to create converted random data. At step 1109, storing the converted random data and public key in a plurality of software executables using a steganographic encoding technique. At step 1111, encrypting data of interest with the public and private keys. At step 1113, transferring the encrypted data of interest. At step 1115, retrieving the converted random data and public key from the plurality of software executables using a steganographic decoding technique. At step 1117, extracting the first random data from the converted data using the conversion function and a second random data of the plurality of random data. At step 1119, reseeding an encryption algorithm with the combined data to regenerate the public key and the private key.

Although the invention has been described in detail with reference to certain preferred embodiments, variations and modifications exist within the spirit and scope of the invention as described and defined in the following claims.

The invention claimed is:

1. An unmanned secure communication system comprising:
   a first device with an electronics section, wherein the electronics section includes a computer readable medium with:
      a random data module configured to provide a plurality of random data;
      a predetermined data module configured to provide predetermined data;
      an encryption-in-transit (EiT) module configured to encrypt and decrypt data transferred between the first device and a second device using the plurality of random data and the predetermined data to seed an encryption algorithm, wherein the EiT module comprises:
         a first key generation encoding module configured to hash the predetermined data to create hashed data, combine the hashed data with a first random data of the plurality of random data into combined data, and seed the encryption algorithm with the combined data to generate a public key and a private key:
         a key generation decoding module configured to use a recovery function to recover the first random data using a second random data of the plurality of random data, recreate the combined data to reseed the encryption algorithm, and recover the public and private keys; and
         a communication module configured to transfer data and the public and private keys between the first device and the second device; and
   the second device, wherein the second device is capable of wirelessly communicating with the first device through the unmanned secure communications system.

2. The system of claim 1, wherein the computer readable medium further comprises:
an encryption-at-rest (EaR) module configured to encrypt and decrypt data stored in the first device using the plurality of random data and the predetermined data; and
a post-operation (PO) module configured to encrypt data during system operations and decrypt data after the system operations using the predetermined data.

3. The system of claim 1, wherein first key generation encoding module is further configured to encode the first random data into a first encoded random data;
wherein the first key generation encoding module is further configured to store the public key and the first encoded random data are steganographically concealed within software executables;
wherein the key generation decoding module is further configured to extract the public key and the first encoded random data from the software executables.

4. The system of claim 1, wherein the communication module is further configured to use a first, a second, and a third network channel to communicate;
wherein the first and second network operate at mutually exclusive times;
wherein the first and second network channels transfer the publics keys between the first and second devices;
wherein the third network channel transfers encrypted data between the first and second devices.

5. The system of claim 3 further comprising the first device, wherein the first device is an unmanned system comprising:
a random data source that provides random data to the first data module; and
a predetermined data source that provides predetermined data to the second data module.

6. The system of claim 5, the random data source comprising at least one sensor, wherein the random data comprises sensor data recorded by the at least one sensor.

7. The system of claim 6, wherein the random data comprises entropic portions of the sensor data.

8. The system of claim 2, wherein the EaR module comprises:
a first key generation encoding module configured to hash the predetermined data, combine the hashed data with a first random data of the plurality of random data into combined data, and seed an encryption algorithm with the combined data to generate a key encryption key (KEK), wherein the KEK encrypts data encryption keys (DEKs) generated by the first device; and
a key generation decoding module configured to use a recovery function to recover the first random data using a second random data of the plurality of random data, recreate the combined data to reseed the encryption algorithm, and recover the KEK.

9. The system of claim 8, wherein first key generation encoding module is further configured to encode the first random into a first encoded random data;
wherein the first key generation encoding module is further configured to store the KEK and the first encoded random data are steganographically concealed within software executables;
wherein the key generation decoding module is further configured to extract the KEK and the first encoded random data from the software executables.

10. The system of claim 2, wherein the predetermined data comprises a plurality of data segments;
wherein the PO module comprises:
a second key generation encoding module configured to seed an encryption algorithm with the plurality of data segments on the first device;
a key regeneration module configured to reseed the encryption algorithm with the plurality of data segments.

11. The system of claim 10, wherein each data segment of the plurality of data segments is zeroized on the first device and stored on the second device at predetermined intervals, wherein the key regeneration module uses the plurality of data segments stored on the second device.

12. A method of providing secure communications comprising:
providing an unmanned secure communication system comprising:
a first device with an electronics section including a computer readable medium with:
a random data module configured to provide a plurality of random data;
a predetermined data module configured to provide predetermined data; and
an encryption-in-transit (EiT) module configured to encrypt and decrypt data transferred between a first device and a second device using the plurality of random data and the predetermined data to seed an encryption algorithm;
combining a first random data of the plurality of random data with the predetermined data into combined data;
seeding the encryption algorithm with the combined data to generate a public key and a private key;
converting the first random data using a conversion function to create converted random data;
encrypting data of interest with the public and private keys;
transferring the encrypted data of interest;
extracting the first random data from the converted random data using the conversion function and a second random data of the plurality of random data; and
reseeding the encryption algorithm with the combined data to regenerate the public key and the private key.

* * * * *